(12) United States Patent
Duncanson, Jr.

(10) Patent No.: US 8,929,552 B2
(45) Date of Patent: Jan. 6, 2015

(54) ELECTRONIC INFORMATION AND CRYPTOGRAPHIC KEY MANAGEMENT SYSTEM

(75) Inventor: Paul T. Duncanson, Jr., Bangkok (TH)

(73) Assignee: No Magic, Inc., Golden, CO (US)

(*) Notice: Subject to any disclaimer, the term of this patent is extended or adjusted under 35 U.S.C. 154(b) by 2089 days.

(21) Appl. No.: 10/479,646

(22) PCT Filed: Jun. 3, 2002

(86) PCT No.: PCT/US02/17683
§ 371 (c)(1),
(2), (4) Date: Dec. 1, 2003

(87) PCT Pub. No.: WO02/100022
PCT Pub. Date: Dec. 12, 2002

(65) Prior Publication Data
US 2004/0151318 A1    Aug. 5, 2004

Related U.S. Application Data

(60) Provisional application No. 60/295,056, filed on Jun. 1, 2001.

(51) Int. Cl.
*H04L 9/00*   (2006.01)
*G06F 21/00*   (2013.01)
*H04L 29/06*   (2006.01)
*G06F 21/62*   (2013.01)
*H04L 9/08*   (2006.01)

(52) U.S. Cl.
CPC .......... *H04L 63/062* (2013.01); *G06F 21/6209* (2013.01); *H04L 63/0428* (2013.01); *H04L 9/083* (2013.01); *H04L 9/0861* (2013.01)
USPC ........................................... 380/277; 726/27

(58) Field of Classification Search
None
See application file for complete search history.

(56) References Cited

U.S. PATENT DOCUMENTS 4,386,233 A * 5/1983 Smid et al. .................... 380/281
4,888,800 A   12/1989 Marshall et al. ................ 380/21
(Continued)

FOREIGN PATENT DOCUMENTS

WO   WO 02/05480       1/2002   ................ H04L 9/00
WO   WO 02/35329 A2   2/2002   ................ G06F 1/00

OTHER PUBLICATIONS

Schneier, B., "Applied Cryptography: Protocols, Algorithms, and Source Code in C", Second Edition 97-100, 169-185, 213-228(1995).

(Continued)

*Primary Examiner* — Minh Dinh
*Assistant Examiner* — Devin Almeida
(74) *Attorney, Agent, or Firm* — Santangelo Law Offices, P.C.

(57) ABSTRACT

Systems and methods of electronic information securement. The invention provides for the securement of electrical information and cryptographic keys through cryptographic key management systems providing for the confirmation that one or a plurality of cryptographic keys have been secured to the key management system. Confirmation provided by the key management system enables other systems to perform cryptographic and electronic information functions such as encryption, decryption, saving, and transferring of information. Further systems are provided having at least one client system, at least one cryptographic key management system, and at least one electronic information storage system, whereby the key management system enables functionality of the system after providing securement confirmation of keys and data.

37 Claims, 7 Drawing Sheets

(56) References Cited

U.S. PATENT DOCUMENTS

| | | | |
|---|---|---|---|
| 5,265,164 A | 11/1993 | Matyas et al. | 380/30 |
| 5,276,737 A | 1/1994 | Micali | 380/30 |
| 5,315,658 A | 5/1994 | Micali | 380/30 |
| 5,481,610 A | 1/1996 | Doiron et al. | 380/21 |
| 5,495,533 A | 2/1996 | Linehan et al. | 380/21 |
| 5,778,072 A | 7/1998 | Samar | 380/30 |
| 5,833,956 A | 11/1998 | Gorlin et al. | 424/49 |
| 5,883,956 A | 3/1999 | Le et al. | 380/4 |
| 5,901,227 A | 5/1999 | Perlman | 380/21 |
| 5,917,911 A | 6/1999 | Dabbish et al. | 380/21 |
| 5,933,503 A | 8/1999 | Schell et al. | 380/25 |
| 6,118,874 A | 9/2000 | Okamoto et al. | 380/282 |
| 6,212,634 B1 | 4/2001 | Geer et al. | 713/156 |
| 6,587,110 B1 * | 7/2003 | Kunimatsu et al. | 345/502 |
| 7,155,414 B2 * | 12/2006 | Barritz et al. | 705/59 |
| 2002/0016919 A1 * | 2/2002 | Sims, III | 713/193 |
| 2003/0033545 A1 * | 2/2003 | Wenisch et al. | 713/202 |

OTHER PUBLICATIONS

U.S. Appl. No. 60/295,056, "Secure Data Partitioning and Encryption Key Management System", filed Jun. 1, 2001, 17 pages and 2 drawings.

* cited by examiner

ELECTRONIC INFORMATION AND CRYPTOGRAPHIC KEY MANAGEMENT SYSTEM

CROSS-REFERENCES TO RELATED APPLICATIONS

This application is the National Stage of International Application No. PCT/US02/17683, filed Jun. 3, 2002, which claims the benefit of U.S. Provisional Application No. 60/295,056, filed Jun. 1, 2001, each priority application hereby incorporated by reference.

FIELD OF THE INVENTION

The present invention is directed to cryptographic systems and electronic information protection and management. Specifically, the present invention is directed to systems and methods for the securement of electronic information. Embodiments of the present invention may be especially applicable to systems for the confirmation of the securement of cryptographic keys and associated electronic information.

BACKGROUND OF THE INVENTION

One of the changes that have taken place in the United States, and most of the rest of the world to one degree or the other, has been the advent of electronic information in day-to-day life. Electronic information is constantly in use and it is difficult to imagine many aspects of modern day life, which are not dependent to one degree or another on such information. Today, electronic information is at work in our automobiles, workplaces and homes. It is used today by consumers, businesses and governments.

In many respects, computers and the electronic information, which they create, store and communicate, are replacing paper and pencil and are replacing previously established ways of doing day-to-day activities. Sending an e-mail is replacing sending a greeting card through the mail. On-line bill paying and electronic funds transfers are replacing trips to the utility companies offices to pay a bill or mailing payments. Electronic transactions with credit or debit cards are replacing the cash we carry in our wallets and the checks we used to write. Purchases through a company's web site are replacing trips to shopping malls. Most of the foregoing involves the creation, storage, use and communication of electronic information.

In response to these changes the workplace has evolved as well. The modern day workplace now often consists of computers arrayed into networks with one network communicating to another. All of the computers found in these networks are creating, storing, using and communicating electronic information.

Similar changes have occurred outside the workplace as well. More and more homes now have computers and many of them are connected to the Internet. Newspaper and television advertising now lists a company's web-page address alongside, or in place of, its physical address.

In many respects, electronic information is becoming the lifeblood of modern-day society. The unexpected loss of electronic information can carry with it tremendous consequences. The loss of electronic information can result in severe disruptions of business activities and, in a worst-case scenario, can result in the destruction of a business. In less severe circumstances, the loss of electronic information can also impose significant costs upon a business that is seeking to restore or recreate that information. It should be undisputed that electronic information can represent substantial value for modern-day businesses and can be of critical importance. Records and other stored or saved information are often necessary for the efficient functioning of today's business. In many instances, information governs business relationships with other persons such as customers, government authorities and investors.

With the ever-increasing emphasis being placed upon information, which is created and stored, electronically important questions have been presented concerning the ownership of that information. These questions arise in large part from the realization that the electronic information has value. Employers have enacted policies governing the ownership of information, which is stored on computers owned by the employers and used by their employees. Litigation has also further defined those ownership rights. Legislation has been enacted to mandate privacy policies for information obtained over the Internet along with legislation intended to address many of the questions that have been raised regarding ownership of information, generally, and ownership of information provided over the Internet specifically.

Electronic information may have value to the person who created it or to the person for whom it was created. It may represent a valuable idea which an inventor or author may want to keep secret and later reap the economic benefits associated with that information. In another setting, the information can represent a company's trade secrets, know-how, and the like. Electronic information can also represent information, which may not have any value in and of itself, but may be information, which could cause harm or embarrassment if disclosed.

The creation of information, along with the intellectual property rights associated with information, have become the foundation of many modern-day businesses. As such, they have become highly treasured and valued assets. They can represent a company's books and records and this, in turn, can be viewed as representing a substantial part of a company's goodwill and on-going concern value. In short, much of what used to be kept in a safe or a vault, a secured room or a locked filing cabinet can now be found saved on a desktop computer. With the realization that electronic information has value also comes the realization that the value associated with that information comes from its proper use. Conversely, it is also true that the value associated with that information can be lost, or can inure to the benefit of another, if the data is misappropriated.

As with physical assets from earlier times, today's businesses have enacted and implemented procedures for the safeguarding of their assets including electronic information. One technique used involves backing up or storing electronic information in a secure fashion. What in earlier times was represented by a locked filing cabinet is currently being replaced by user id's, passwords and cryptographic keys. While in earlier times sprinkler systems and fire extinguishers were used to prevent the loss or destruction of business assets, today some electronic data representing the valued information may be backed up at secure facilities at various points around the globe.

The proliferation of electronic information being used in today's business environment has moved more quickly and covered more ground than techniques used for safeguarding and backing up the electronic information. A variety of techniques are currently being used. One technique often involves backing up data from a hard drive to some other electronic medium. That medium can be something as common as a floppy disk or the transferring of data onto a CD-ROM. Other more sophisticated techniques include backing up data to other hard drives, tape drives or magneto optical drives. These back up techniques are often employed as a safeguard against equipment failure, fire, natural disaster, theft and other forms of information compromise, attack, or other loss. These backup techniques are intended to provide a safe and secure repository for the electronic information, which can be irreplaceable or very difficult or costly to replace.

Another change, which has revolutionized society, has been the world of the Internet. Today's businesses are embracing the communications capabilities represented by the Internet in greater and greater numbers. Many businesses are finding the Internet and electronic communications media are an integral part of their day-to-day business activities. Since the Internet in many respects represents a public forum, the exposing of sensitive or valuable business information over the Internet to potential interception by third parties constitutes a danger to many businesses. Toward the end of reducing this risk to businesses many have begun to employ cryptographic technology in the transmission of information over the Internet and other means of communication.

It is common today for businesses and consumers alike to conduct business activities over the Internet through the use of secure web sites. Secure sites usually involve using cryptographic technology to encrypt data, as it is moving between businesses or between consumers and businesses. Cryptographic technology can mask or disguise the data so that it is of no use to any party intercepting or otherwise obtaining the data while it is in its encrypted state.

Similar technology is often being used inside a business itself. Cryptographic technology is sometimes being used by people inside a business to protect the data that they are creating or using and which belongs to their employer. It is not uncommon for employees to encrypt the data, which is on their computers. In so doing, they are protecting that data from wrongful appropriation, disclosure or use.

The use of the cryptographic technology in the safeguarding of electronic information can involve the use of one or more cryptographic keys, such as encryption and decryption keys. One or more encryption keys can be used in conjunction with one or more cryptographic algorithms, the mathematical functions used for encryption and decryption, to provide the necessary information for taking unencrypted information, frequently referred to as plaintext, and turning the unencrypted information into encrypted information, frequently referred to as ciphertexts. In a symmetric algorithm, frequently referred to as a single-key encryption setting or a single-key algorithm, the same key is used to encrypt and decrypt the data, or otherwise stated, the encryption key and the decryption key are the same and the encryption key can be calculated from the decryption key and decryption key from the encryption key. In a public-key algorithm, sometimes referred to as a public key algorithm or a public key encryption setting, public and private keys may be used in order to encrypt or decrypt data, the public key(s) being different that the private key(s).

The possession or control of the keys, including one or both decryption and encryption keys, and depending in part upon the employed cryptosystem (the algorithms and all possible plaintexts, ciphertexts, and keys), may carry with it the ability to control the electronic information. While it is in an encrypted state, the electronic information may be of little or no value to anyone except the person to whom the information belongs or has been assigned. A decryption key, for example, can allow the electronic information to be taken from its encrypted state, as ciphertexts, to an unencrypted state, as plaintext. Therefore, the person in possession of the decryption key, in some cryptosystems, exercises a significant degree of control over the data. If one or more of the keys fall into the possession of a person from whom the information is to be safeguarded, the purpose behind encryption can often be frustrated. In other words, if the person from whom you are seeking to keep the electronic information obtains one or more of the keys, for example, he may be able to decrypt the information, calculate the values of other keys of the cryptosystem, or determine an algorithm for the decryption of the ciphertexts of the electronic information, among other possible attacks.

The control, transfer or possession of cryptographic keys can now present significant challenges. Absent adequate safeguards and control procedures for the creation and safeguarding of cryptographic keys, electronic information back up and cryptographic systems can be compromised. As described above, if one or more of the keys is copied or becomes available to others, many of the benefits associated with the encryption of electronic information can be lost. In addition, the misuse of cryptographic keys can result in additional costs and losses to businesses. One example can involve the disgruntled employee. In this example, a disgruntled employee may encrypt the data on his computer using an encryption key, which is different from the one that was either assigned to him or previously used by him. He then does not disclose the new key to his employer and the employer is effectively deprived of the data, which is stored on the employee's computer. Another example can involve the misuse of cryptographic keys by other employees of an employer. In this example, other employees of an employer who are responsible for maintaining and safeguarding cryptographic keys may abuse their responsibilities and use the decryption keys to search and view data which is stored on their co-workers computers. Not only can such abuses result in an invasion of employee's privacy, but it may also result in employees who do not have a right to view certain information coming into possession of that same information, such as trade secrets of the company. If that information has significant value, that information can be sold or conveyed to a competitor or other third party to the detriment of the employer. It may also be used to harass or embarrass other employees and may have the effect of disrupting the work place.

The need for security of information data cannot be overstated. Much has been written in the recent years about future conflicts being conflicts over information technology. Several government authorities have devoted considerable time and material to combating attacks upon their web pages. In addition, economic espionage is on the increase. The treasure, which is being sought in economic espionage, is often electronic information. Since the Internet in many respects is a public or semi-public place, the use of encryption technology can be indispensable for the movement of data through the Internet. Use of that encryption technology can also carry with it demands that the cryptographic keys be properly maintained and used.

Conventional systems do not provide optimal technology for proper maintenance and control over encryption keys and, in turn, the electronic information which is to be protected. Attempts have been made to address the security concerns surrounding electronic information, cryptographic systems, and the corresponding cryptographic keys. Several attempts are disclosed in the following patent documents, hereby listed in the provided List of References to be Incorporated. However, many of the conventional attempts may not have fully appreciated the risks involved not only relevant to the cryptographic keys, but with regard to the underlying electronic information. If use of the information, especially that of encryption, decryption, or information transfer, is allowed prior to securing the cryptographic key, the information could be intercepted and used to learn of and potentially access one or more of the cryptographic keys. Such unintended compromise of the information and cryptographic keys, as well as attacks to learn of the information and keys, have created the presently identified need for a system that can confirm cryptographic key securing prior to allowing a function affecting the electronic information or keys.

Some prior art systems may provide a conventional backup system as depicted in FIG. 1. In a conventional backup system the client computer, for example the computer whose electronic information is being saved, backed up, or otherwise safeguarded, may be connected through an electronic medium to another computer or network which may act as the backup computer for the information. The goal of the back of system can be to create a copy of the electronic information found on the client computer on the backup computer. The information that is being backed up can be backed up in an unencrypted or encrypted state. Information backed up in an unencrypted state may create greater risk of misappropriation or otherwise undesired viewing or use of the electronic information. In order to add an additional level of security, encryption may be used to encrypt the data from the client computer to the backup computer. However, such conventional systems do not address recognized security issues regarding the securement of keys of the cryptosystem(s), security with respect to the back-up computer itself, or the relation between the securement of electronic information and the keys used in the encryption and decryption of such information.

Other conventional systems have attempted to address the recognized needs of security with regarding to cryptographic keys. Key escrows, key directory services, and key management centers, key distribution centers, and key arbitration centers have been utilized for the back up of cryptographic keys. However, these systems may have merely provided another back-up system for the keys, not fully addressing the need for heightening security with regard to securing the cryptographic keys and the corresponding electronic information. Such back-up systems may themselves be the subject of an attack to learn of the cryptographic keys and may not address the additional concern for the storage and security of the electronic information itself. Such key back-up systems may be found in patent references WO 02/05480, WO 02/35329, and U.S. Pat. Nos. 5,265,164, 6,118,874, 5,778,072.

Particularly, a need may exist for electronic information and key management systems that may ensure the securement of the cryptographic keys such that securement of the electronic information may be provided. For example, numerous attacks may be made utilizing one or more portions of the cryptosystem (algorithm, plaintexts, ciphertexts, and keys) in order to cryptoanalyze the system. The "attacker" seeks to obtain, for example, through cryptanalysis, the value of the encryption key or the plaintext to the encrypted electronic information. One such method might include intercepting the cryptographic keys to compare with other information, such as intercepted ciphertexts or known plaintext. If the security of the keys is in question, so might the security of every other element of the cryptosystem. For example, if the keys have not been adequately secured from attack or compromise and some electronic information has been obtained, potentially available to an attacker through an unsecured communication line, the attacker might easily determine the value of an decryption key for later retrieval and decryption of electronic information provided as ciphertext. As another example, if a cryptographic key is intercepted prior to its securement and ciphertexts has been encrypted and transmitted over a communication medium to which an attacker has eavesdropped or otherwise compromised, the attacker may intercept the ciphertexts, decrypt the information, and send the ciphertext along to the intended recipient, potentially without detection. The interception of cryptographic keys may be a significant threat, further stressing a need for both secure information back-up systems and cryptographic key management systems, as well as the ability to determine if such securement of the cryptographic keys and information has been achieved.

Therefore, a heretofore long-felt but unaddressed need potentially exists with regard to confirming the securement of the cryptographic keys, and hence potentially the other elements of the cryptosystem, including the electronic information. The heretofore patent references do not appear to address such needs and may actually disclose techniques directed away from such identified concerns.

Other patent references, such as U.S. Pat. Nos. 5,901,227, 5,883,956, 5,933,503, 5,917,911, 5,276,737, 5,315,658, and 4,888,800, purport to provide cryptographic techniques. These references, however, do further appear to inadequately address the securement of cryptographic keys, including the securement of keys relative to the securement of the electronic information. Furthermore, it appears that no indication is made of ensuring or confirming the securement of cryptographic keys and electrical information, or confirming and enabling other cryptographic activity, such as in the transmission or cryptographic manipulation of the information.

U.S. Pat. No. 5,495,533 appears to be directed to a personal key archive for managing keys to encrypt and decrypt stored data on a computer system. However, and as previously identified in other art references, U.S. Pat. No. '533 does not appear to address the identified need of confirming the securement of the electronic information that might allow or enable a more secure set of electronic information functions. U.S. Pat. No. '533 appears to be directed to the sending of a key from the key server, apparently without a confirmation of the securement of the cryptographic keys to the system or other desirable features addressing security of the present art.

Again, it appears that no indication is made of ensuring or confirming the securement of cryptographic keys and electrical information, or confirming and enabling other cryptographic activity, such as in the transmission or cryptographic manipulation of the information. The lack of provision for the confirmation of secured cryptographic keys, and the resulting lack of ability to provide corresponding secure information, all as heretofore identified but unaddressed needs in the conventional systems, leave such conventional systems apparently lacking in desirable security for present day cryptographic needs.

Further, other security measures may be taken to protect the cryptographic keys and electronic information. One such measure could provide a key management separate from a system function or component backing-up the electronic information provided by conventional electronic information and cryptographic key systems. As previously mentioned, an attacker to a cryptographic system may try for an attack of, or look for a compromise in, the cryptographic key storage facility. Also of potential concern to the attacker, as previously mentioned, is acquisition of at least a portion of the ciphertexts or the underlying plaintext of the electronic information. Conventional systems may provide combined systems that do not adequately secure or separate the portions of electronic information, including the cryptographic keys, desired by the attacker in cryptoanalyzing the ciphertexts or the cryptosystem, generally. An additional need, therefore, exists for a system that may provide distinct systems of an electronic information system to protect the various components of a cryptosystem.

SUMMARY OF THE INVENTION

The present invention provides systems that address the inadequacies that may have existed with prior electronic information and cryptographic key systems. Accordingly, the present invention provides a secure electronic information securement system and method for securing electronic information. The present invention may even be considered in some aspects as a development away from that which was previously known in the art of electronic information cryptography and storage.

Accordingly, one object of the present invention is to provide electronic information and cryptographic key management systems that provide security to both the cryptographic keys and the electronic information that is to be protected. A goal of the present invention, therefore, is to provide systems that secure at least one cryptographic key, confirm such securing of the key, and enable a function of the system responsive to the confirmation, and the methods thereof. The invention may be provided as electronic information securement systems, cryptographic key management systems, cryptography systems, other types of systems, and methods thereof.

A further object of the present invention is to provide electronic information and cryptographic key management systems that provide desirable functionality and separateness of systems and that further allow for security concerns to be sufficiently addressed with respect to potential access to secured cryptographic keys and electronic information. A goal of the present invention, therefore, is to provide systems that secure electronic information, including at least one cryptographic key, by way of a system providing a client system, a cryptographic key management system, and an electronic information storage system, wherein at least one of the client system and the electronic information storage system are responsive to a confirmation of the cryptographic key management system, and methods thereof. Further, a goal of the present invention is to provide a separate cryptographic key management system that provides enhanced security, and in some embodiments is remote or provides restricted access to secured cryptographic keys and other electronic information, and corresponding methods thereof.

Other objects of the invention are disclosed throughout other areas of the specification and claims. In addition, the goals and objectives may apply either in dependent or independent fashion to a variety of other goals and objectives in a variety of embodiments. In particular, and as may be noted from the claims, for efficiency many claims have been presented only in either method or apparatus contexts. It should be understood that as to all elements, additional or corollary method or apparatus claims may be presented at a later time and such should be understood as encompassed by the existing disclosure.

DETAILED DESCRIPTION OF THE INVENTION

Figure 1:
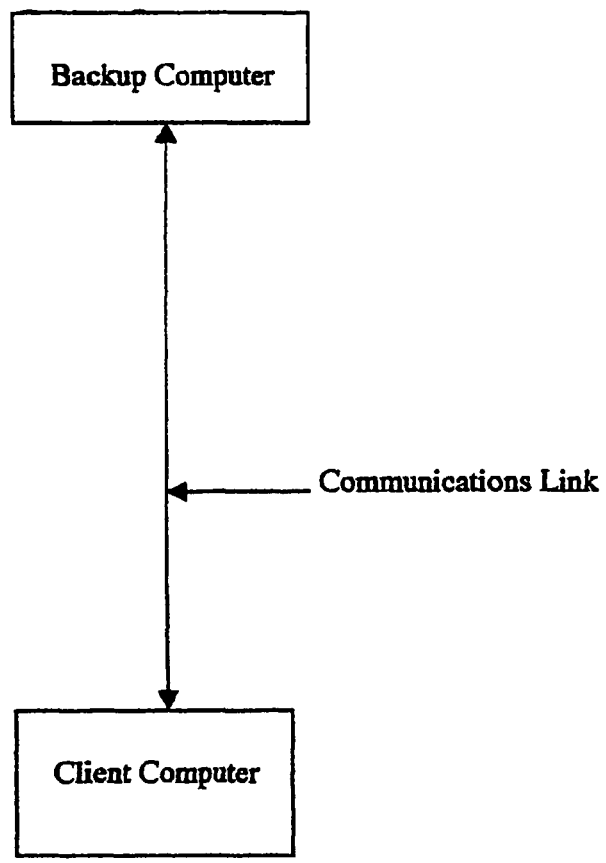
FIG. 1 is a schematic diagram showing a conventional information backup system.
Figure 2:
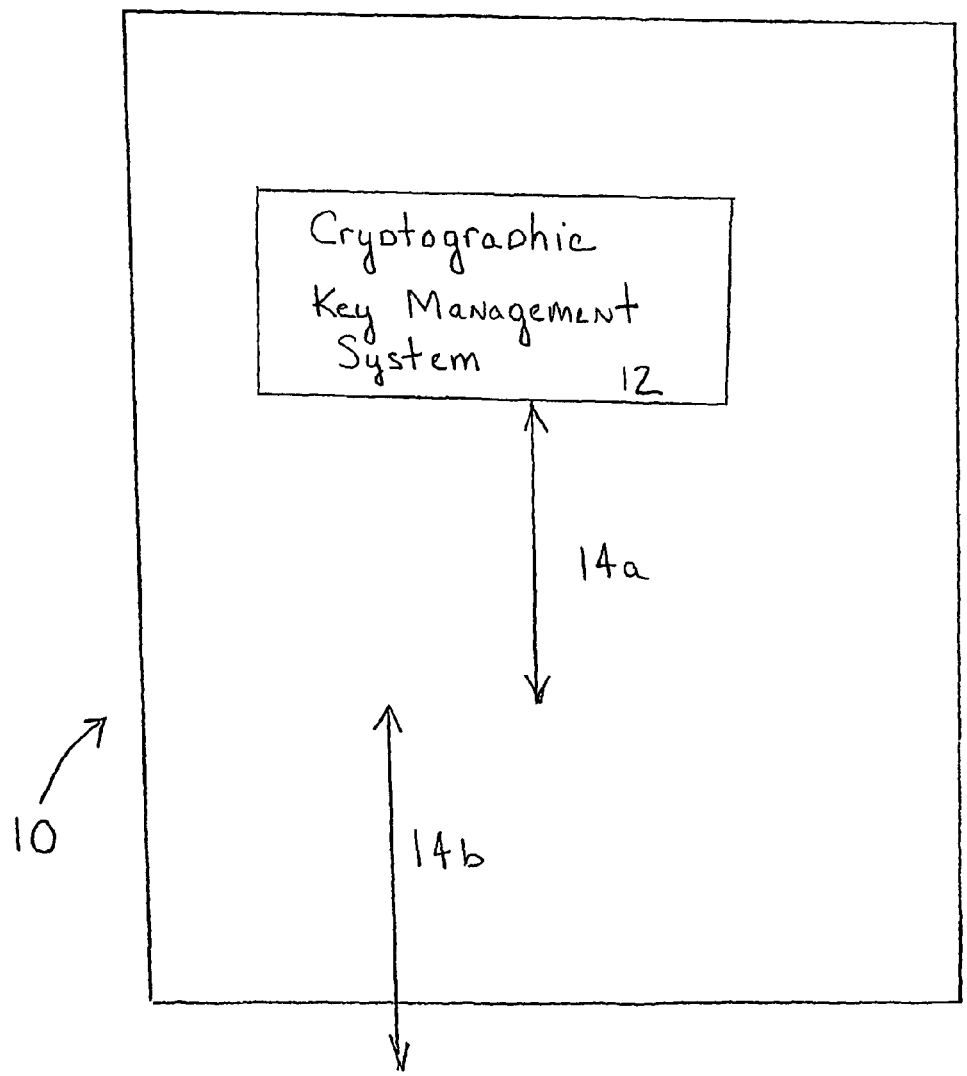
FIG. 2 is a schematic and functional diagram of embodiments of the present invention.

Accordingly, and as broadly shown in FIG. 2, one embodiment of the present invention is a cryptography system 10 comprising at least one cryptographic key management system 12. A plurality of cryptographic key management systems are also within the scope of the invention in accomplishing the various goals thereof. Generally, the cryptographic key management system is configured, in some embodiments, to confirm the securing 14 of at least one cryptographic key. A plurality of cryptographic keys may also be secured in accordance with the present invention. The securing of at least one cryptographic key may occur such that the at least one cryptographic key management system 12 is provided opportunity to confirm the securement of the at least one key, as more particularly described below. The cryptography system 10 is generally depicted in FIG. 2 as comprising the at least one cryptographic key management system 12, but may include, in various embodiments, other features and systems thereof, as more particularly described below.

Particularly, and as shown in FIG. 2, confirmation of the securement of the at least one cryptographic key is provided. Securing 14 of at least one cryptographic key may be the encryption, the saving, the transfer, or the restriction of access to the secured at least one cryptographic key, or a combination thereof. Other examples of securing of the at least one cryptographic key are further defined and described in the following discussion, all of which should be construed for each embodiment of the present invention. Either the cryptography system 10, generally, or the cryptographic key management system, in this embodiment, respectively, may actually secure 14b, 14a the at least one cryptographic key, and other systems or components of cryptography system 10 may provide for the securing of the key or keys. In preferred embodiments the cryptographic key management system will encrypt, save, transfer, restrict access to, or otherwise secure the key or keys. In this embodiment, and as shown in FIG. 2, the securing 14 of the at least one cryptographic key, or in some embodiments the electronic information, is confirmed, even though a cryptographic system configuration may exist such that the cryptographic key management system does not directly secure 14b the key or keys. The confirmation may occur through electrical or other communication between the cryptographic key management system 12 and the cryptography system 10 and portions thereof.

Figure 3:
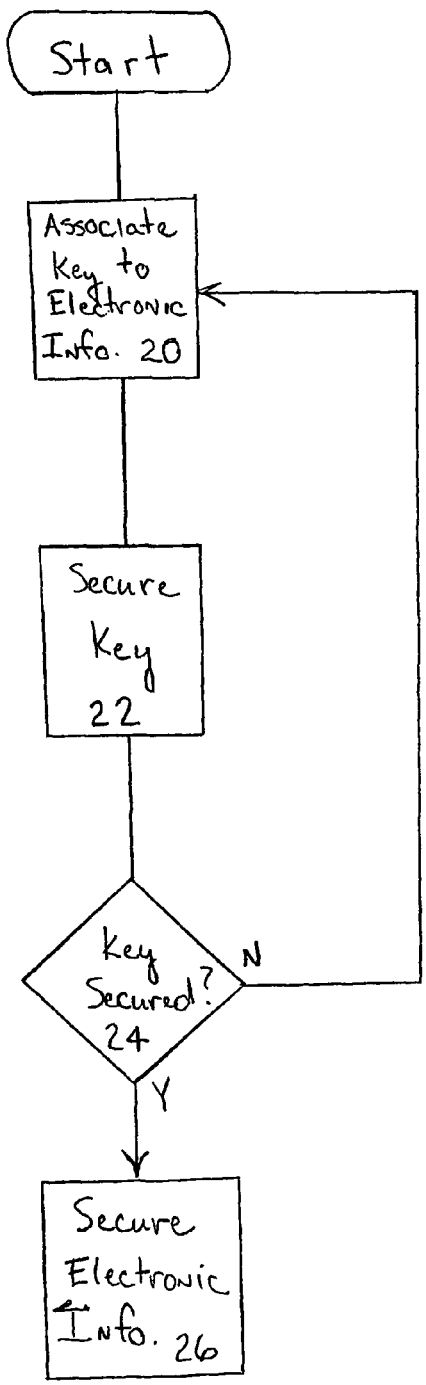
FIG. 3 is a flow chart of one embodiment of the present invention.

A cryptography method, furthermore, may comprise the following steps, as shown in FIG. 3, for at least one or a plurality of keys. It should be preliminarily noted, however, that as described the methods and processes of the present invention should not be construed to necessarily follow in the order described, claimed, or as shown in the figures. The present invention and the claims directed to such inventive methods and processes should not necessarily, therefore, be construed as claims limited to any particular sequence, except as required for the teaching of the present invention.

The at least one cryptographic key may be associated with electronic information 20. The association of the key with electronic information may be performed 20 to identify the information with a particular user or system, may be provided to ensure retrieval of the information and key according to compartmentalization techniques as described below, or more generally, to allow for encryption and decryption of the electrical information. Securing at least one cryptographic key 22, as previously discussed, and as further discussed below, can be provided. After a confirming step 24 is made of the step of securing, securing said electronic information 26 is provided. In some embodiments the step of confirmation of the step of securing may be provided by the at least one cryptographic key management system.

The securing of electronic information may be provided by the at least one cryptographic key management system, although other systems may also provide such features, as further described below. The securing of electronic information may be similar to the securement of encryption keys, such as through the encrypting of electronic information, transferring electronic information, saving electronic information, or through restricting access to electronic information, such as restricting to physical access, as more particularly described below. These and other types of electrical information securement will be more particularly described.

The step of confirming or the configuration to confirm is provided such that an initiation of securing, such as the initiating of encrypting, transferring, saving, restricting access, e.g. initiating a save function in a computer or software/firmware buffer, batch file, delayed executable file or directory, cache memory, or the like, is also construed and hereby defined to be confirming or as providing a configuration to confirm by the cryptographic key management system, the cryptography system, and other features as described below. Again, and in regarding to securing at least one cryptographic key defined as the saving of the key or keys, the actual save feature should be construed as saved to, encompassing such features as the initiation of a save function. Such "saved to" feature, however, is of sufficient permanency and finality to allow for the secure features throughout the present invention.

An additional step may be included as enabling a function 28 in response to said step of confirming. The step of confirmation, as previously described, is important to maintain the security of the cryptography system. Once confirmed, however, other functions may be performed as desired, in achieving the securement of electronic information. The functions enabled, in preferred embodiments, may be the functions such as: enabling the encryption of electronic information, enabling the decryption of electronic information, enabling the transfer of electronic information, enabling the saving of electronic information, enabling electronic information to be read, enabling electronic information to be rewritten, enabling electronic information to be created, and enabling electronic information to be manipulated. Other enabling functions may be included and considered within the scope of the present invention. The step of enabling a function in response to the step of confirming should further be viewed as a step independent from step 50 of securing electronic information. This additional step allows for greater functionality and the additional manipulation of electronic information, including securing electronic information concepts as disclosed herein.

The cryptographic key management system can be various key systems, apparatus, device(s), or element(s) configured in accordance with the present invention. The cryptographic key management system may comprise at least one system of the following, as variously implemented in the field: a key management system, a key backup system, a key escrow, a key escrow agent, a cryptographic library, a key certification authority, a key distribution center, a key management center, a key arbitration center, a directory service, a database, a computer system, a terminal, a server, a network, a memory, a domain, a smart card, a read-only memory, a chip, software, and firmware. Each of these systems may function as a key management system, but may provide more or less function relative to other key management systems. Several of these systems may be further described below. The above-described elements can further be comprised of instructions, potentially stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processors, and storage media. Furthermore, a domain may be defined as systems or subsystems of one or more networks, servers or computer systems, which may be dedicated to one or various functional tasks such as security, distribution, or the like.

Again with reference to FIG. 2, an embodiment of the present invention may further provide a cryptographic key management system 12 configured to confirm the securing of at least one cryptographic key 14a, 14b. However, in accordance with this present embodiment, the cryptographic key management system 12 is configured to enable a function in response to a confirmation of the securing of said at least one cryptographic key, providing functionality of the cryptographic key management system 12.

Figure 4:
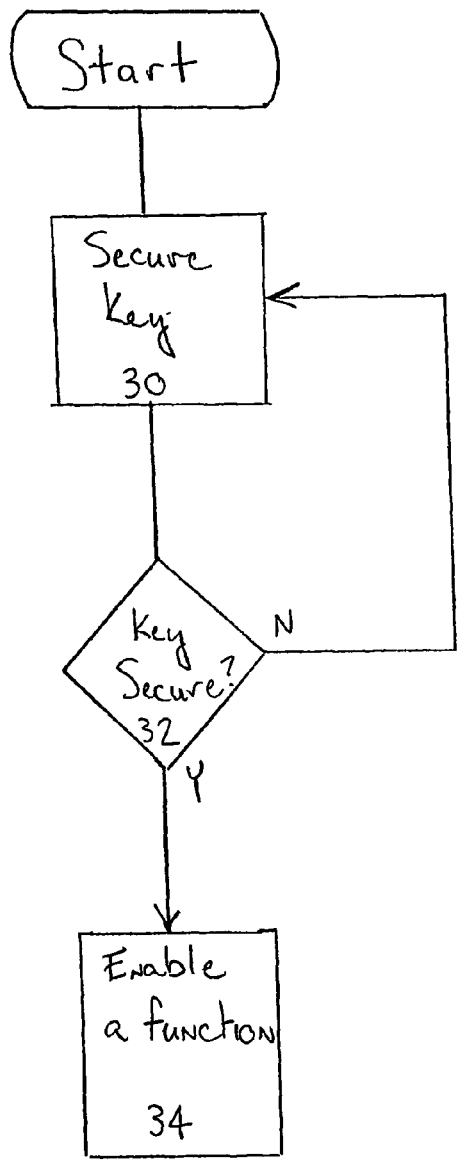
FIG. 4 is a flow chart of a second embodiment of the present invention.
Figure 5:
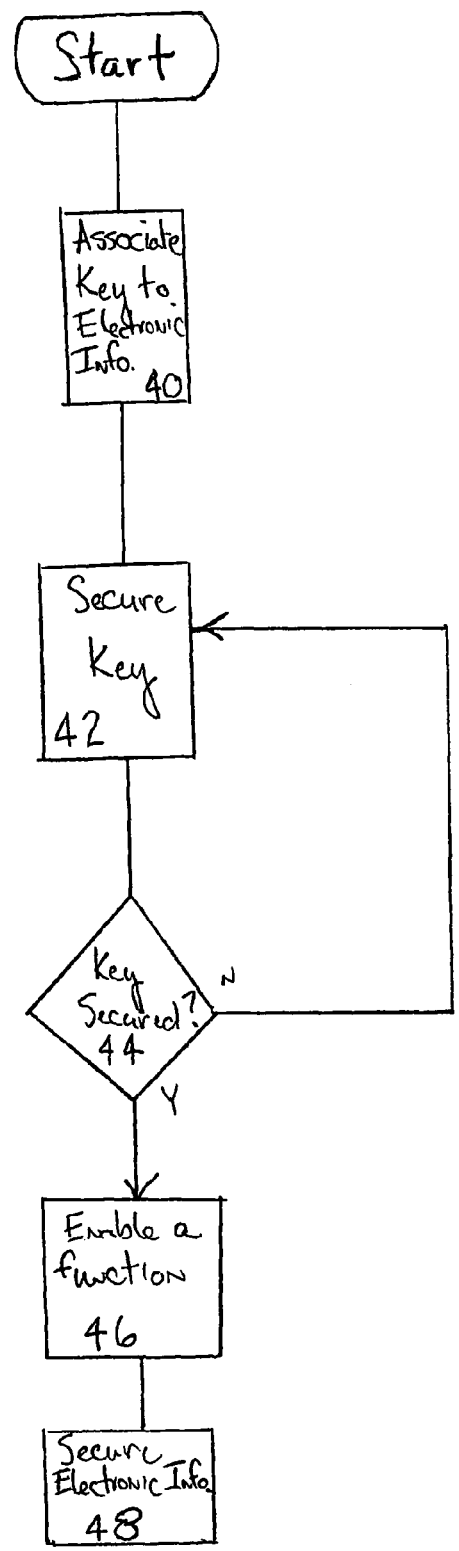
FIG. 5 is a schematic and functional diagram of one embodiment of the present invention.

Accordingly, a method for cryptographic key management is disclosed in the present invention, as shown in FIG. 4, which may be conducted for at least one or a plurality of keys. The method provides securing at least one cryptographic key 30, as previously discussed in other embodiments and as further discussed below. After an affirmative confirming step 32 is made of the step of securing, enabling a function responsive to the step of confirming 34. The step of confirming may be provided by a cryptographic key management system and an additional step of associating the at least one key with electronic information as previously described. Furthermore, the step of securing electronic information and securing the at least one key include encrypting, transferring, saving, and restricting access, including restricting to physical access, as previously described and as will be further discussed in detail below. The method may also provide for the step of enabling a function, the enablement of a function such as: enabling the encryption of electronic information, enabling the decryption of electronic information, enabling the transfer of electronic information, enabling the saving of electronic information, enabling electronic information to be read, enabling electronic information to be rewritten, enabling electronic information to be created, and enabling electronic information to be manipulated.

Accordingly, a method of securing electronic information and an electronic information securement system will be discussed in detail. The method is particularly shown in the flow chart of FIG. 4. Accordingly, and as previously described, the at least one cryptographic key may be associated with electronic information 40. Securing at least one cryptographic key 42, as previously discussed, and as further discussed below, can be provided. Confirming step 44 is made of the step of securing, and enabling a function 46 is provided, as previously described and as further described herein. Securing said electronic information 48 is provided.

Figure 6:
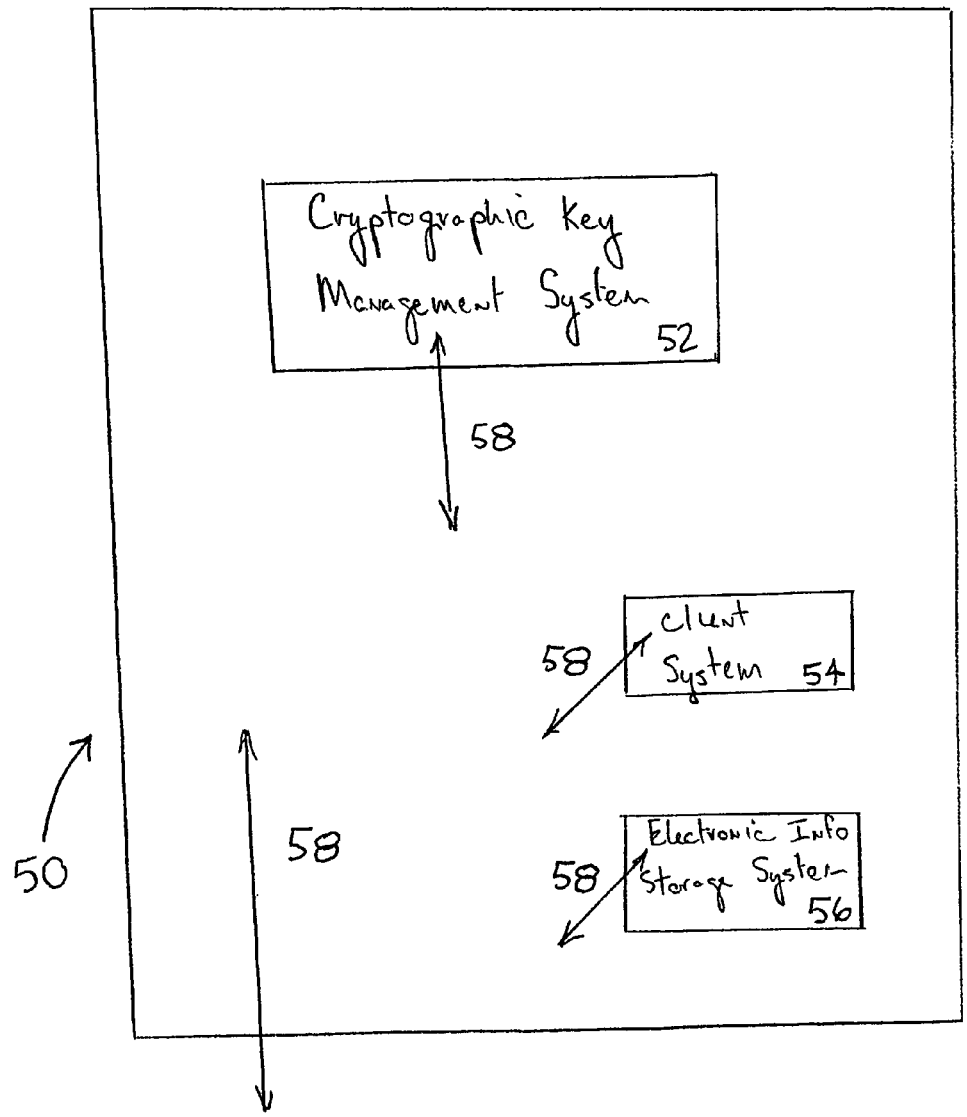
FIG. 6 is a flow chart of a third embodiment of the present invention.

The electronic information securement system 50 of this present embodiment may be described as comprising at least one cryptographic key management system 52 configured to confirm the securing of a cryptographic key, as previously described, wherein the electronic information securement system is enabled to perform a function in response to a confirmation from the at least one cryptographic key management system and is configured to secure electronic information. FIG. 6 provides a functional schematic of one system embodiment. Electronic information as defined generally for the present invention, may comprise data, at least one signal, electronic communication, at least one computer file, at least one cryptographic key, plaintext, ciphertexts, at least one user identification, at least one password, and at least one random number. Electronic information is transferred, secured, or otherwise received by the system and components of the embodiment of FIG. 6. Further, electronic information may correspond to the disclosed methods as produced thereby.

The methods of the present invention may further provide for generating the at least one cryptographic key. Systems, elements, or other features of the present invention may generate the keys, such systems including at least one cryptographic key management system, at least one client system 54, or at least one electronic information storage system 56. The at least one client system, in some embodiments, may comprises, and the step of generating at least one cryptographic key by at least one client system may be selected from the group consisting of: a database, a computer system, a terminal, a server, a network, a random number generator, a memory, a domain, a smart card, a read-only memory, a chip, software, and firmware. The at least one electronic information storage system and a step of generating at least one cryptographic key by at least one electronic information storage system may be selected from the group consisting of: a key management system, a key backup system, a key escrow, a key escrow agent, a cryptographic library, a key certification authority, a key distribution center, a key management center, a key arbitration center, a directory service, a database, a computer system, a terminal, a server, a network, a random number generator, a memory, a domain, a smart card, a read-only memory, a chip, software, and firmware. In some embodiments, the at least one cryptographic key management system could be a system responsive to the at least one electronic information storage system providing in combination for both the management of cryptographic keys and information storage. As previously mentioned the at least one cryptographic key management system could be any variety of management systems and could be a component of the at least one electronic information storage system, such as a memory, domain, or the like.

Figure 7:
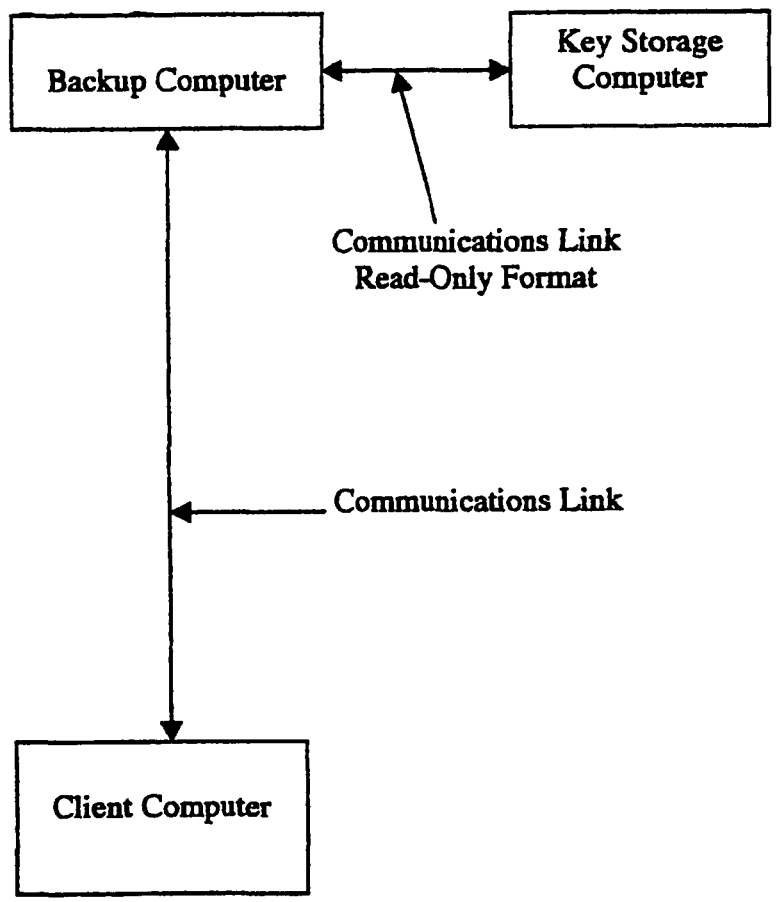
FIG. 7 is a schematic diagram of another embodiment of the present invention.

Additional system embodiments may comprises an electronic information securement system, generally shown in FIG. 7, comprising a client system; a cryptographic key management system communicatively coupled to said client system and configured to confirm securing of at least one cryptographic key; and an electronic information storage system communicatively coupled to said client system and said cryptographic key management system; wherein at least one of said client system and said electrical information storage system are responsive to a confirmation from said cryptographic key management system. A method of securing electronic information may comprising the steps of: securing at least one cryptographic key; confirming by a cryptographic key management system said step of securing; providing a response of at least one of said client system and said electronic information storage system responsive to said step of confirming; and securing electrical information.

Further additional embodiments may provide an electronic information securement system, comprising: a client system; a electronic information storage system communicatively coupled to said client system; and a separate cryptographic key management system communicatively coupled to said client system and said electronic information storage system. A method of securing electronic information is also disclosed, comprising the steps of securing at least one cryptographic key; separately confirming said step of securing; and securing electronic information responsive to said step of confirming.

Confirmation of the generation of the at least one key may be provided, and confirmation of the generation of an appropriate key may also be desirable. A valid key may be defined with regard to the present invention as a key generated under a defined cryptosystem. As previously defined, a cryptosystem includes the algorithms, plain and ciphertext, and the keys. It would be desirable to confirm a valid key generation by providing appropriate confirmation through known cryptographic and cryptoanalytic techniques to check the key's validity. This may require the generation of the desired key-based algorithm and confirming the generation of the key based upon the key for the algorithm. Further, the confirmation of a valid key as a key generated in a read-only format could be desired to prevent tampering with the cryptographic key value.

In accordance with the present invention, further features may be provided in securing the at least one cryptographic key. The cryptographic key or keys may be saved, encrypted, or both, and secured to a system such as the cryptographic key management system. In preferred embodiments, the keys will be saved to the cryptographic key management system, but may be encrypted by any of the other included systems, such as the at least one client system, the at least one electronic information storage system, and the various embodiments thereof as previously described.

Further with regard to securing the at least one cryptographic key, and as mentioned, the key or keys may be encrypted for further security. Such encryption may take the form of various techniques, such as partial encryption, encrypting the keys in a plurality of encryptions states, such as multiple encryption and encryption utilizing differing cryptosystems and algorithms. Encryption may also occur during transmission of the key or keys, and one preferred embodiment might utilize secure socket layer (SSL) technology. Another technique might include encryption of a plurality of portions of the key, saving at least a portion of the key to the key management system, or encrypting the plurality of key portions, and saving portions of keys to at least one, and maybe a plurality of key management system, through saving each key portion to at least one key management system or the at least one electronic information storage system, and the various varieties thereof.

An additional feature of the present invention may provide the association of the at least one cryptographic key with at least one system identification. The system identification may exist in the form of a user name and password to a system, or may be selected based upon their indicia qualities, such as the group consisting of: a ticket, a pointer, a certificate, an add-on module, user information, and a random number. As previously mentioned with regard to keys, the system identification may be generated by the at least one client system or the at least one electronic information storage system, and the various varieties thereof, or by at least one cryptographic key management system. Both the system identification and cryptographic keys may be secured to system embodiments such as the at least one cryptographic key management system, such as by saving, encrypting, or both, of said keys and said system identification.

Further, access to the at least one cryptographic key and the at least one system identification can be restricted to access such as from the group: user identification, password access, ticket access, pointer access, certificate access, add-on module access, user information access, and random number access. The step of securing may further provide for restricting access as such. Confirming securing at least one system identification and the step of enabling a function can comprise enabling a function responsive to the steps of confirming securing the at least one cryptographic key and the at least one system identification. Enabling a function may comprises enabling a function selected from the group consisting of: enabling the encryption of electronic information, enabling the decryption of electronic information, enabling the transfer of electronic information, enabling the saving of electronic information, enabling electronic information to be read, enabling electronic information to be rewritten, enabling electronic information to be created, and enabling electronic information to be manipulated.

Further, the securing of electronic information can comprise associating the keys, system identification, and electronic information such as through compartmental association. Compartmental association can provide the electronic information from, for example, the client system to be encrypted and backed up on, for example, the electronic information storage system. Since keys might be assigned, such as through system identification such as to either individual computers or departments, the data which is being backed up could be effectively compartmentalized based on the assignment of the key and the fact that control over the keys might be strictly maintained by the cryptographic key management system.

An embodiment of the invention could further send an acknowledgment from the cryptographic key management system to the other systems providing that the key has been properly secured, such as through the creation, storage and encryption of data. For example, providing acknowledgment to at least one electronic information storage system, or to at least one client system, of the step of securing the at least one cryptographic key in response to said step of confirming. The steps of confirming securing the at least one cryptographic key and providing acknowledgment of the step of securing said at least one cryptographic key are provided by at least one cryptographic key management system.

Embodiments of the present invention, as previously discussed, may enable a function responsive to said step of confirming, such as enabling the encryption of electronic information, enabling the decryption of electronic information, enabling the transfer of electronic information, enabling the saving of electronic information, enabling electronic information to be read, enabling electronic information to be rewritten, enabling electronic information to be created, and enabling electronic information to be manipulated, and wherein the electronic information may include from the group: data, at least one signal, electronic communication, at least one computer file, at least one cryptographic key, plaintext, cyphertext, at least one user identification, at least one password, and at least one random number. The enablement may be provided through the generation of at least one cryptographic key and can be provided as a function of the at least one client system, the at least one key management system, and the at least one electronic information storage system.

The electronic information provided or secured may be secured in accordance with the methods and system of securing the cryptographic keys, as in: encrypting electronic information; decrypting electronic information; transferring electronic information; encrypting said electronic information during transferring; encrypting said electronic information comprises encrypting electronic information in a secure socket layer; saving electronic information; saving electronic information to at least one electronic information storage system; saving electronic information to at least one electronic information storage system selected from the group consisting of: a key management system, a key backup system, a key escrow, a key escrow agent, a cryptographic library, a key certification authority, a key distribution center, a key management center, a key arbitration center, a directory service, a database, a computer system, a terminal, a server, a network, a random number generator, a memory, a domain, a smart card, a read-only memory, a chip, software, and firmware. Further, securing the information may provide: saving electronic information to at least one cryptographic key management system responsive to said electronic information storage system and securing electronic information comprises securing electronic information in response to said step of providing acknowledgment.

Additionally, access to the system, such as access to the key management system, may be restricted, such as: securing said at least one cryptographic key by restricting access to said at least one cryptographic key to physical access, such as through the use of a monitor or secured data storage facility. Access may be further restricted to at least one electronic information storage system. Also, access may be restricted by the at least one cryptographic key to physical access by a client or at least one administrator.

Access to electronic information may also be restricted to simultaneous access requests: to electronic information to substantially simultaneous access requests comprises restricting access to substantially simultaneous access requests of a plurality of administrators, to system requests providing system identification, such as that previously described, and restricting access to electronic information based upon cryptographic systems, algorithms, and protocols as previously described.

As can be easily understood from the foregoing, the basic concepts of the present invention may be embodied in a variety of ways. It involves both methods of securing electronic information, methods of encryption key management, and methods of cryptography, for example, as well as devices to accomplish the methods. In this application, the methods are disclosed as part of the results shown to be achieved by the various devices described and as steps, which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element, which causes that action.

Similarly, each physical element disclosed should be understood to encompass a disclosure of the action, which that physical element facilitates. Regarding this last aspect, as but one example, the disclosure of a "encryption system" should be understood to encompass disclosure of the act of "encrypting"—whether explicitly discussed or not—and, conversely, were there effectively disclosure of the act of "encrypting", such a disclosure should be understood to encompass disclosure of a "encryption system" and even a "means for encrypting". Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference, unless specifically stated otherwise. Finally, all references listed in any information statement filed with the application are hereby incorporated by reference, however, as to each of the above, to the extent that such information or statements incorporated by reference might be considered inconsistent with the patenting of this/these invention(s) such statements are expressly not to be considered as made by the applicant(s).

The claims set forth in this specification by are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application, unless explicitly stated otherwise, including any subsequent continuation, division, or continuation-in-part application thereof or any reissue or extension thereon.

It should be preliminarily noted that the term "at least one" as used in the following description and claims is not intended nor used in this disclosure to mean that other claims or descriptions not incorporating the "at least one" language cannot further include one or more like elements. More specifically, the language "at least one" is not intended nor used to change "open-ended" claims, inherently including devices or methods having additional elements or steps apart from those claimed, into "closed-ended" claims wherein devices or methods having additional elements would not be covered by such claims. Accordingly, the use of the transitional phrase "comprising" is used to maintain the "open-end" claims herein, according to traditional claim interpretation.

In addition, unless the context requires otherwise, it should be understood that the term "comprise" or variations such as "comprises", "comprising", "further comprises", and "further comprising" are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

In particular, and as may be noted from the appended claims, for matters of efficiency many claims have been presented have been provided in independent form with a limited number or no dependent claims thereof. It should be understood that as to all disclosed elements, steps, devices, apparatuses, methods, and processes, products by process, and other inventive subject matter, additional, dependent, or corollary method or apparatus claims or other claims may be presented at a later time, including dependent claims, either as claimed in other independent claim groupings or as yet to be claimed, consistent with the present disclosure, and such should be understood as encompassed by the existing disclosure and as part of the inventive concept of the present invention.

I claim:

1. A method of securing electronic information, comprising the steps of:
    associating at least one cryptographic key with electronic information;
    securing said at least one cryptographic key by a first functionality, wherein said step of securing at least one cryptographic key comprises encrypting said at least one cryptographic key in a secure socket layer during transmission of said at least one cryptographic key and saving said at least one cryptographic key to at least one cryptographic key management system;
    separately affirmatively confirming that said step of securing at least one cryptographic key has been appropriately accomplished by a second functionality apart and independent from said first functionality and communicatively coupled to said first functionality in order to allow initial cryptographic functioning of said at least one cryptographic key;
    enabling a function responsive to said step of confirming that said step of securing at least one cryptographic key has been appropriately accomplished; and
    securing electronic information.

2. A method of securing electronic information, comprising the steps of:
    associating at least one cryptographic key with electronic information;
    securing said at least one cryptographic key by a first functionality;
    separately affirmatively confirming that said step of securing at least one cryptographic key has been appropriately accomplished by a second functionality apart and independent from said first functionality and communicatively coupled to said first functionality in order to allow initial cryptographic functioning of said at least one cryptographic key;
    enabling a function responsive to said step of confirming that said step of securing at least one cryptographic key has been appropriately accomplished; and
    securing electronic information, wherein said step of securing electronic information comprises transferring electronic information, and further comprising the step of encrypting said electronic information in a secure socket layer during transferring.

3. A method of securing electronic information, comprising the steps of:
    generating at least one cryptographic key;
    confirming generation of said at least one cryptographic key, wherein said step of confirming generation comprises confirming generation of at least one valid key and further comprising the step of providing said at least one cryptographic key in a read-only format, wherein said step of confirming generation of at least one valid key comprises confirming generation of said cryptographic key in a read-only format;
associating said at least one cryptographic key with electronic information;
securing said at least one cryptographic key by a first functionality;
separately affirmatively confirming that said step of securing at least one cryptographic key has been appropriately accomplished by a second functionality apart and independent from said first functionality and communicatively coupled to said first functionality in order to allow initial cryptographic functioning of said at least one cryptographic key;
enabling a function responsive to said step of confirming that said step of securing at least one cryptographic key has been appropriately accomplished; and
securing electronic information.

4. A method of securing electronic information, comprising the steps of:
associating at least one cryptographic key with electronic information;
securing said at least one cryptographic key by a first functionality;
separately affirmatively confirming that said step of securing at least one cryptographic key has been appropriately accomplished by a second functionality apart and independent from said first functionality and communicatively coupled to said first functionality in order to allow initial cryptographic functioning of said at least one cryptographic key;
enabling a function responsive to said step of confirming that said step of securing at least one cryptographic key has been appropriately accomplished; and
securing electronic information, wherein said step of securing electronic information comprises restricting access to electronic information to situations where the system receives substantially simultaneous access requests from a plurality of administrators in order to allow access to secure electronic information under conditions of enhanced security.

5. A method of securing electronic information as described in claims 1, 2, or 4, further comprising the steps of: generating said at least one cryptographic key; and confirming generation of said at least one cryptographic key.

6. A method of securing electronic information as described in claim 5, wherein said step of confirming generation comprises confirming generation of at least one valid key and further comprising the step of providing said at least one cryptographic key in a read-only format, wherein said step of confirming generation of at least one valid key comprises confirming generation of said cryptographic key in a read-only format.

7. A method of securing electronic information as described in claims 1, 2, 3 or 4, wherein said step of securing at least one cryptographic key comprises encrypting said at least one cryptographic key by at least one client system and saving said at least one cryptographic key to at least one cryptographic key management system, wherein said at least one client system is selected from the group consisting of: a database, a computer system, a terminal, a server, a network, a random number generator, a memory, a domain, a smart card, a rom, a chip, software, and firmware.

8. A method of securing electronic information as described in claims 1, 2, 3, or 4, wherein said step of securing at least one cryptographic key comprises encrypting said at least one cryptographic key by at least one electronic information storage system and saving said at least one cryptographic key to at least one cryptographic key management system, wherein said at least one electronic information storage system is selected from the group consisting of: a key management system, a key backup system, a key escrow, a key escrow agent, a cryptographic library, a key certification authority, a key distribution center, a key management center, a key arbitration center, a directory service, a database, a computer system, a terminal, a server, a network, random number generator, a memory, a domain, a smart card, a read-only memory, a chip, software, and firmware.

9. A method of securing electronic information as described in claim 3, wherein said step of securing at least one cryptographic key comprises encrypting said at least one cryptographic key in a secure socket layer during transmission of said at least one cryptographic key and saving said at least one cryptographic key to at least one cryptographic key management system.

10. A method of securing electronic information as described in claims 1, 2, 3, or 4, wherein said step of associating at least one cryptographic key with electronic information comprises associating at least one cryptographic key with at least one system identification selected from the group consisting of: a ticket, a pointer, a certificate, an add-on module, user information, and a random number.

11. A method of securing electronic information as described in claim 10, further comprising the step of generating said at least one user identification by at least one electronic information storage system selected from the group consisting of: a key management system, a key backup system, a key escrow, a key escrow agent, a cryptographic library, a key certification authority, a key distribution center, a key management center, a key arbitration center, a directory service, a database, a computer system, a terminal, a server, a network, a random number generator, a memory, a domain, a smart card, a read-only memory, a chip, software, and firmware.

12. A method of securing electronic information as described in claims 1, 2, 3, or 4, further comprising the step of providing acknowledgment to at least one electronic information storage system of said step of securing said at least one cryptographic key in response to said step of confirming, said at least one electronic information storage system selected from the group consisting of: a key management system, a key backup system, a key escrow, a key escrow agent, a cryptographic library, a key certification authority, a key distribution center, a key management center, a key arbitration center, a directory service, a database, a computer system, a terminal, a server, a network, a random number generator, a memory, a domain, a smart card, a read-only memory, a chip, software, and firmware.

13. A method of securing electronic information as described in claim 3, wherein said step of securing electronic information comprises transferring electronic information, and further comprising the step of encrypting said electronic information in a secure socket layer during transferring.

14. A method of securing electronic information as described in claims 1, 2, 3, or 4, wherein said step of securing electronic information comprises saving electronic information to at least one electronic information storage system selected from the group consisting of: a key management system, a key backup system, a key escrow, a key escrow agent, a cryptographic library, a key certification authority, a key distribution center, a key management center, a key arbitration center, a directory service, a database, a computer system, a terminal, a server, a network, a random number generator, a memory, a domain, a smart card, a read-only memory, a chip, software, and firmware.

15. A method of securing electronic information as described in claims 1, 2 or 3, wherein said step of securing electronic information comprises restricting access to electronic information to situations where the system receives substantially simultaneous access requests from a plurality of administrators in order to allow access to secure electronic information under conditions of enhanced security.

16. An electronic information securement system, comprising:
   an electronic information securement system having a securement functionality;
   at least one cryptographic key management system having a separate affirmative confirmation functionality configured to confirm that securing of a cryptographic key has been appropriately accomplished by a functionality apart and independent from said securement functionality and communicatively coupled to said securement functionality in order to allow initial cryptographic functioning of said at least one cryptographic key wherein said electronic information securement system is enabled to perform a function in response to a confirmation from said at least one cryptographic key management system and is configured to secure electronic information; and
   at least one client system communicatively coupled to said at least one cryptographic key management system and configured to secure electronic information, and wherein access to electronic information secured to said at least one client system is restricted to situations where the system receives substantially simultaneous access requests in order to allow access to said secure electronic information under conditions of enhanced security.

17. An electronic information securement system, comprising:
   an electronic information securement system having a securement functionality;
   at least one cryptographic key management system having a separate affirmative confirmation functionality configured to confirm that securing of a cryptographic key has been appropriately accomplished by a functionality apart and independent from said securement functionality and communicatively coupled to said securement functionality in order to allow initial cryptographic functioning of said at least one cryptographic key, wherein said electronic information securement system is enabled to perform a function in response to a confirmation from said at least one cryptographic key management system and is configured to secure electronic information; and
   at least one electronic information storage system communicatively coupled to said at least one cryptographic key management system and configured to secure electronic information, and wherein access to electronic information secured to said at least one electronic information storage system is restricted to situations where the system receives substantially simultaneous access requests in order to allow access to said secure electronic information under conditions of enhanced security.

18. An electronic information securement system, comprising:
   an electronic information securement system having a securement functionality;
   at least one cryptographic key management system having a separate affirmative confirmation functionality configured to confirm that securing of a cryptographic key has been appropriately accomplished by a functionality apart and independent from said securement functionality and communicatively coupled to said securement functionality in order to allow initial cryptographic functioning of said at least one cryptographic key, wherein said at least one cryptographic key management system is configured to secure electronic information, and wherein access to electronic information secured to said at least one cryptographic key management system is restricted to situations where the system receives substantially simultaneous access requests in order to allow access to said secure electronic information under conditions of enhanced security;
   wherein said electronic information securement system is enabled to perform a function in response to a confirmation from said at least one cryptographic key management system and is configured to secure electronic information.

19. An electronic information securement system as described in claims 16, 17 or 18 wherein said at least one cryptographic key management system is configured to secure cryptographic keys and wherein access to cryptographic keys secured to said at least one cryptographic key management system is restricted to physical access.

20. An electronic information securement system as described in claims 16, 17 or 18 further comprising at least one client system communicatively coupled to said at least one cryptographic key management system and configured to secure cryptographic keys, and wherein access to cryptographic keys secured to said at least one client system is restricted to physical access.

21. An electronic information securement system as described in claims 16, 17, or 18 further comprising at least one electronic information storage system communicatively coupled to said at least one cryptographic key management system and wherein said at least one electronic information storage system is configured to secure cryptographic keys, and wherein access to cryptographic keys secured to said at least one electronic information storage system is restricted to physical access.

22. An electronic information securement system as described in claim 19, wherein access to secured cryptographic keys is restricted to physical access by a client.

23. An electronic information securement system as described in claim 19, wherein access to secured cryptographic keys is restricted to physical access by an administrator.

24. An electronic information securement system as described in claims 16, 17, or 18, wherein said at least one cryptographic key management system is configured to secure electronic information, and wherein access to electronic information secured to said at least one cryptographic key management system is restricted to physical access.

25. An electronic information securement system as described in claims 16, 17, or 18, further comprising at least one client system communicatively coupled to said at least one cryptographic key management system and configured to secure electronic information, and wherein access to electronic information secured to said at least one client system is restricted to physical access.

26. An electronic information securement system as described in claims 16, 17, or 18, further comprising at least one electronic information storage system communicatively coupled to said at least one cryptographic key management system and configured to secure electronic information, and wherein access to electronic information secured to said at least one electronic information storage system is restricted to physical access.

27. An electronic information securement system as described in claim 24, wherein access to secured electronic information is restricted to physical access by a client.

28. An electronic information securement system as described in claim 24, wherein access to secured electronic information is restricted to physical access by an administrator.

29. An electronic information securement system as described in claim 16, 17 or 18, wherein access to secured electronic information is restricted to situations where the system receives substantially simultaneous access requests from a plurality of administrators in order to allow access to said secure electronic information under conditions of enhanced security.

30. An electronic information securement system as described in claim 20, wherein access to secured cryptographic keys is restricted to physical access by a client.

31. An electronic information securement system as described in claim 21, wherein access to secured cryptographic keys is restricted to physical access by a client.

32. An electronic information securement system as described in claim 20, wherein access to secured cryptographic keys is restricted to physical access by an administrator.

33. An electronic information securement system as described in claim 21, wherein access to secured cryptographic keys is restricted to physical access by an administrator.

34. An electronic information securement system as described in claim 25, wherein access to secured electronic information is restricted to physical access by a client.

35. An electronic information securement system as described in claim 26, wherein access to secured electronic information is restricted to physical access by a client.

36. An electronic information securement system as described in claim 25, wherein access to secured electronic information is restricted to physical access by an administrator.

37. An electronic information securement system as described in claim 26, wherein access to secured electronic information is restricted to physical access by an administrator.

* * * * *